United States Patent [19]

Waters

[11] 3,928,491

[45] Dec. 23, 1975

[54] MODIFIED VINYL ESTER RESIN AND PIPE MADE THEREFROM

[75] Inventor: William D. Waters, Tulsa, Okla.

[73] Assignee: Youngstown Sheet and Tube Company, Youngstown, Ohio

[22] Filed: Dec. 26, 1973

[21] Appl. No.: 428,116

[52] U.S. Cl. ............... 260/837; 260/836; 138/153
[51] Int. Cl.² ..................................... C08L 63/10
[58] Field of Search ........................... 260/836, 837

[56] References Cited
UNITED STATES PATENTS

| | | | |
|---|---|---|---|
| 3,535,403 | 10/1970 | Holub | 260/836 |
| 3,674,893 | 7/1972 | Nowak | 260/836 |
| 3,707,583 | 12/1972 | McKown | 260/837 |
| 3,742,086 | 6/1973 | Epel | 260/836 |
| 3,753,755 | 8/1973 | Olson | 260/836 |
| 3,808,114 | 4/1974 | Tsuchihara | 260/835 |

Primary Examiner—Carman J. Seccuro
Attorney, Agent, or Firm—Vinson, Elkins, Searls, Connally & Smith

[57] ABSTRACT

A flexible crack-resistant and chemically resistant thermosetting vinyl ester resin is produced by co-reacting an epoxy resin, a carboxyl terminated elastomer and an unsaturated monocarboxylic acid, such as acrylic or methacrylic acid. The neat resin is miscible and copolymerizable with ethylenically unsaturated monomers such as styrene. A novel cast pipe utilizes the resin of the invention as an unreinforced crack-resistant inner lining.

11 Claims, No Drawings

MODIFIED VINYL ESTER RESIN AND PIPE MADE THEREFROM

The present invention relates to thermosetting resins, and more particularly to a novel vinyl ester resin with improved properties formed by reacting an epoxy, a rubber and an unsaturated monocarboxylic acid, such as acrylic acid. The resins of the invention, preferably mixed with an ethylenically unsaturated monomer, such as styrene, find particular application as improved crack-resistant, chemically resistant liners for cast pipe.

Centrifugally cast pipe has been produced for a number of years using thermosetting resins. While a variety of techniques have evolved to prepare such pipe, the process basically involves combining a thermosetting resin with a reinforcing cylindrical sock inserted in a cylindrical rotating mold, casting the pipe by centrifugal force and then curing to produce a hard, reinforced plastic pipe having the general shape of the mold.

For pipe intended for the transport of corrosive fluids, excess resin is used in the manufacturing process so as to not only encapsulate the reinforcement, but also to form a resin-rich unreinforced liner on the inner diameter of the pipe to insulate and protect the reinforcing material from the corrosive fluid. One problem involving pipe of this construction is the ease with which the unreinforced resin-rich liner cracks during normal handling and installation of the pipe. Any cracks, of course, permit corrosive fluid to contact the reinforcing material and thereby weaken the pipe. The cracking problem, in turn, results from the fact that the available thermosetting plastics possessing sufficient chemical resistance are brittle.

One technique for increasing the toughness and crack-resistance of vinyl ester resins is the incorporation of powdered thermoplastics in the thermosetting resin. Although successful to a degree, this technique introduces further processing problems. For instance, the resin viscosity increases upon incorporation of a solid powder which then requires additional special equipment for introducing the mixture into the pipe mold. Also, during casting, the pipe must be rotated at a sufficiently slow speed to prevent separation of the solid particles due to centrifugal force. This increases the manufacturing time and cost.

It is accordingly the primary object of the present invention to provide a novel thermosetting resin suitable for use as an unreinforced liner in cast pipe.

Another object is to provide such a resin which overcomes the prior art problems in handling and casting.

Another object is to provide a flexible, yet chemically-resistant resin with a viscosity approximating that of the polyester resins normally encountered in the preparation of centrifugally cast pipe.

A further object is to provide thermosetting resins which are homopolymerizable in the presence of typical vinyl polymerization initiators, such as the peroxy initiators; for example, benzoyl peroxide, and which are miscible with and copolymerizable with a variety of ethylenically unsaturated monomers as, for example, styrene.

Another object is to provide resins which are also miscible with and copolymerizable with polyhydroxy diacrylate esters of acrylic acids and diglycidyl ethers of bisphenol A; for example, the reaction product of methacrylic acid and diglycidyl ether of bisphenol A.

A still further object is to provide novel cast pipe which utilizes the cured resin of the invention as an unreinforced liner as well as to provide methods for producing such pipe.

These and other objects and advantages will become apparent from the following detailed explanation and examples of the invention.

The resin of the invention is obtained by reacting an epoxy resin, a carboxyl terminated elastomer and an unsaturated monocarboxylic acid. The preferred epoxy resins are diepoxides which have linking epoxy groups at each end of the molecule but lack the mid-chain epoxy groups which produce cross-linking and increase the viscosity of the resulting vinyl ester resin. The epoxy equivalent weight of such di-epoxide resins may vary from about 150 up to about 6000. These resins are produced in commercial quantities by reacting epichlorohydrin with a polyhydroxy compound such as bisphenol A in a caustic liquid. The molecular weight of the resulting resin will depend upon the ratio of epichlorohydrin to polyol employed. The preferred diepoxide is manufactured by Shell Chemical Company, and sold under the trademark Epon 826. It is preferred because of its low viscosity. It may be approximately represented by the chemical formula:

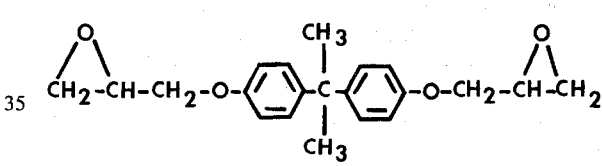

Other suitable di-epoxide resins are those marketed by Shell Chemical Company under the trademarks Epon 828, Epon 834, Epon 1001, Epon 1002, Epon 1004, Epon 1007, Epon 1010 and mixtures thereof.

While di-epoxides are preferred because they produce vinyl ester resins with lower viscosities, other epoxy resins have also been found to be useful in producing the improved resins of the invention. Specifically, novolac resins having the general formula

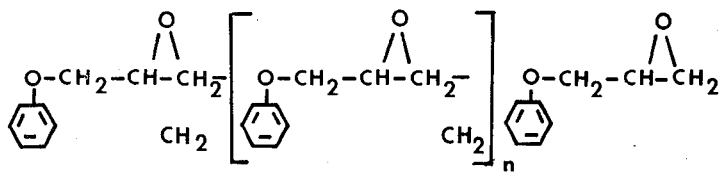

(wherein $n = 0-10$) have been found useful with the preferred novolac being one marketed by Dow Chemical Company under the trademark DEN 431.

The selected epoxy resin is mixed with a carboxyl terminated elastomer and an unsaturated monocarboxylic acid with preferably one chemical equivalent of epoxy being provided for each equivalent of carboxyl provided by the acid and elastomer combined. Two di-carboxyl terminated rubbers which have been found satisfactory are manufactured by B. F. Goodrich Chemical Co. and sold under the trademarks Hycar CTB and Hycar CTBN. Hycar CTB is a carboxyl terminated butadiene and may be approximately represented by the formula:

HOOC—[CH₂—CH=CH—CH₂—]ₓCOOH wherein x represents the number of butadiene units per molecule, which number is not known to applicant.

Hycar CTBN is a carboxyl terminated random copolymer of approximately 80% butadiene and 20% acrylonitrile which may be approximately represented by the formula

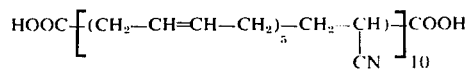

These and other elastomers having a functional carboxyl termination at each end of the polymer chain are described more fully in U.S. Pat. No. 3,285,949. Hycar CTBN is the preferred elastomer because it is less expensive.

The reaction may be catalyzed in the conventional manner by tertiary amines such as pyridine, basic compounds such as sodium hydroxide, metal chelates, onium catalysts, triphenyl stibine, triphenyl phosphine and other catalysts known to those skilled in the art; the preferred catalyst being pyridine. The reaction may also employ an effective amount of an inhibitor to prevent premature reaction at the acrylic acid double bonds. Approximately 100 to 600 parts per million of hydroquinone functions satisfactorily as a polymerization inhibitor.

The neat resin may then be mixed and copolymerized with a suitable ethylenically unsaturated monomer such as styrene. Other suitable ethylenically unsaturated monomers are those listed in U.S. Pat. Nos. 3,367,992 and 3,683,045. The resin may be cured by adding a free radical yielding catalyst such as benzoyl peroxide.

It is not necessary for one skilled in the art to know or understand the details of the reactions involved in order to make or use the resins of the invention. Nevertheless, such reactions are a matter of interest, and the following reactions are therefore given as those believed to be involved in forming the resin of the invention. However, applicant makes no representation that the indicated reactions actually occur or that other or different reactions do not occur. The reactions are not to be construed in any way as defining or limiting the invention, which, of course, is measured solely by the claims. Reactions:

1. Epoxy Resin plus Hycar CTBN wherein

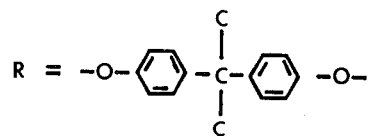

and R respresents the body of the elastomer polymer.

The neat resin of the invention is believed to be a mixture of the reaction products of reactions 2 and 3. The neat resin is then diluted with an ethylenically unsaturated monomer such as styrene, or one of the other monomers identified above.

The styrene containing vinyl ester resin may then be formed into a hard usable product by reacting the double bonds in the presence of a peroxide such as benzoyl peroxide.

Method of Preparation

In forming the resins of the invention, the three ingredients (epoxy resin, unsaturated monocarboxylic acid and carboxyl terminated elastomer) are mixed. An inhibitor and a suitable catalyst, such as a tertiary amine, is added and the mixture is heated to a suitable reaction temperature generally between room temperature and about 175°C. Heating of the reaction mixture continues until the acid value diminishes to a low level, indicating substantially complete reaction between the two reactants, i.e., that the product is free of unreacted epoxide groups and carboxylic acid groups. The product resin is directly recovered as a polymerizable thermosetting resinous substance.

The neat resin may then be mixed with a ethylenically unsaturated monomer such as styrene.

The present resins may be cured with benzoyl peroxide and tertiary butyl perbenzoate.

EXAMPLES

The following examples I through VII show various resins compounded according to the present invention. The laboratory procedure used in carrying out each of the examples I through VII is as follows: The indicated amounts of the epoxy, elastomer, acid, pyridine and hydroquinone were placed in a three liter resin kettle equipped with a heating mantle, thermometer, and

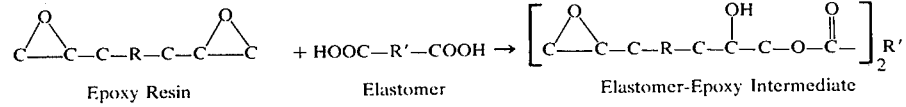

Epoxy Resin        Elastomer        Elastomer-Epoxy Intermediate

2. Epoxy Resin plus Methacrylic Acid airtight stirrer. With continuous stirring the mixture

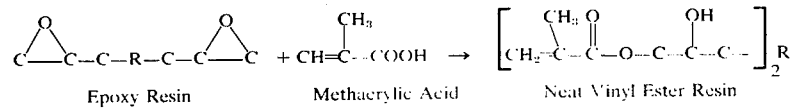

Epoxy Resin        Methacrylic Acid        Neat Vinyl Ester Resin

3. Elastomer-Epoxy Intermediate plus Methacrylic Acid was heated to a temperature of 250° to 300°F. and maintained there until the acid number was reduced to

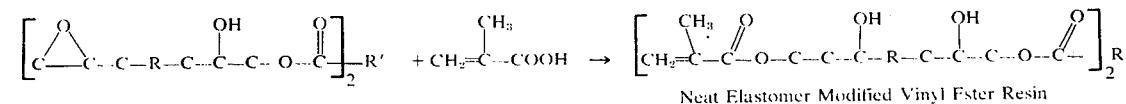

Neat Elastomer Modified Vinyl Ester Resin a value of 20 or less (approximately ½ to 2 hours). The mixture was cooled to 175° F. and the indicated styrene added to the neat resin with stirring. Acid number measurements were taken on the mixed uncured resin utilizing ASTM Procedure D465. Viscosity measurements were taken with a Brookfield Model RVF viscometer. The resin was then cured by adding approximately 0.7 weight percent benzoyl peroxide and 0.2 weight percent tertiary butyl perbenzoate and curing the mixture for 1–2 hours at 200° F to obtain the hard usable end product. Tensile strength, tensile modulus and percent elongation measurements were made on the finished product according to ASTM Procedure D638-61T.

EXAMPLE I

| Ingredients | Grams | Weight Percent |
|---|---|---|
| Epon 826 | 181 | 30.96 |
| Hycar CTBN | 18 | 3.08 |
| Methacrylic Acid | 92 | 15.74 |
| Pyridine | 1.4 | .24 |
| Hydroquinone | 0.17 | .03 |
| Styrene | 292 | 49.95 |
| Acid Number | 6.8 | |
| Viscosity | 45 Cps/75° F | |
| Tensile Strength | 11,029 psi | |
| Tensile Modulus | $3.2 \times 10^5$ psi | |
| Percent Elongation | 5.35 | |

EXAMPLE II

| Ingredients | Grams | Weight Percent |
|---|---|---|
| Epon 826 | 402.2 | 7.93 |
| Hycar CTBN | 2000.0 | 39.42 |
| Methacrylic acid | 122.2 | 2.41 |
| Pyridine | 11.1 | .22 |
| Hydroquinone | 1.52 | .03 |
| Styrene | 2537 | 50.00 |
| Acid Number | 4.6 | |
| Viscosity | 5700 Cps/75°F | |
| Tensile Strength | 352 psi | |
| Tensile Modulus | — | |
| Percent Elongation | 154 | |

EXAMPLE III

| Ingredients | Grams | Weight Percent |
|---|---|---|
| Epon 826 | 181 | 20.56 |
| Hycar CTBN | 180 | 20.45 |
| Methacrylic acid | 77.6 | 8.82 |
| Pyridine | 1.4 | .16 |
| Hydroquinone | .26 | .03 |
| Styrene | 440 | 49.99 |
| Acid Number | 3.5 | |
| Viscosity | 137 Cps/75°F | |
| Tensile Strength | 5016 | |
| Tensile Modulus | $1.9 \times 10^5$ | |
| Percent Elongation | 29.2 | |

EXAMPLE IV

| Ingredients | Grams | Weight Percent |
|---|---|---|
| Epon 1001 | 260 | 20.32 |
| Epon 834 | 120 | 9.38 |
| Methacrylic acid | 77.6 | 6.07 |
| Hycar CTBN | 180.0 | 14.07 |
| Pyridine | 1.4 | .11 |
| Hydroquinone | 0.4 | .03 |
| Styrene | 640 | 50.02 |
| Acid Number | 3.86 | |
| Viscosity | 735 Cps/75°F | |
| Tensile Strength | 5543 psi | |
| Tensile Modulus | $2.0 \times 10^5$ psi | |
| Percent Elongation | 19.6 | |

EXAMPLE V

| Ingredients | Grams | Weight Percent |
|---|---|---|
| Epon 1001 | 260 | 16.04 |
| Epon 834 | 120 | 7.40 |
| Methacrylic acid | 69 | 4.26 |
| Hycar CTBN | 360 | 22.21 |
| Pyridine | 1.4 | .09 |
| Hydroquinone | .5 | .03 |
| Styrene | 810 | 49.97 |
| Acid Number | — | |
| Viscosity | — | |
| Tensile Strength | 2780 psi | |
| Tensile Modulus | — | |
| Percent Elongation | Greater than 100% | |

EXAMPLE VI

| Ingredients | Grams | Weight Percent |
|---|---|---|
| DEN 431 | 176 | 19.33 |
| Methacrylic acid | 80 | 8.78 |
| Hycar CTBN | 180 | 19.77 |
| Pyridine | 1.4 | .15 |
| Hydroquinone | .26 | .03 |
| Styrene | 473 | 51.94 |
| Viscosity | 1887 Cps/72°F | |
| Acid Number | 11 | |
| Tensile Strength | 3200 psi | |
| Tensile Modulus | $1.21 \times 10^5$ psi | |
| Percent Elongation | 26 | |

EXAMPLE VII

| Ingredients | Grams | Weight Percent |
|---|---|---|
| Epon 826 | 180 | 20.35 |
| Hycar CTB | 180 | 20.35 |
| Methacrylic acid | 81 | 9.16 |
| Pyridine | 1.4 | .16 |
| Hydroquinone | .26 | .03 |
| Styrene | 442 | 49.96 |
| Viscosity | 300 Cps/84°F | |
| Acid Number | 3.5 | |
| Tensile Strength | 2400 psi | |
| Tensile Modulus | $1.00 \times 10^5$ psi | |
| Percent Elongation | 18 | |

As shown from the above examples, the percent elongation (flexibility) of the cured resin varies directly with the amount of elastomer incorporated into the composition. Example III above is the preferred commercial composition, with the elastomer comprising approximately 20 percent by weight, resulting in an approximately 30 percent elongation.

In comparison with the improved resins of the invention, a conventional vinyl ester possesses much less flexibility. A commercial vinyl ester resin marketed commercially by Dow Chemical Co. under the trademark "Derakane 411-C-50" showed the following acid number and viscosity:

| | |
|---|---|
| Acid Number | 6.8 |
| Viscosity | 95 Cps/25°F |

Upon curing, as described above, it had the following characteristics:

| | |
|---|---|
| Tensile Strength | 10,430 |
| Tensile Modulus | $3.7 \times 10^5$ |
| Percent Elongation | 4.44 |

The flexible vinyl ester resins of the invention find particular application as crack-resistant, chemically resistant liners for reinforced plastic pipe. In forming such pipe, reinforcing material, such as fiberglass is wound upon an elongated mandrel to provide a reinforcing "sock". The sock is then inserted into an elongated mold mounted for rotation about its longitudinal axis on a centrifugal casting machine. A thermosetting plastic, such as vinyl ester resin, is then introduced into the mold and the mold is rotated, and simultaneously heated, to centrifugally cast and cure the finished pipe. Such pipe, and the method for forming it, are described more fully in U.S. Pat. Nos. 2,785,442 and 3,093,160.

Improved pipe according to the present invention may be provided by utilizing essentially the prior art procedure for producing the reinforced body of the pipe plus the additional step of casting an inside layer or lining of the flexible resin of the present invention. While the neat flexible resin may be used, it is preferred that the flexible lining be formed from the cured mixture of the neat resin and an ethylenically unsaturated monomer such as styrene.

Thus, to provide the pipe of the present invention, suitable reinforcement material is placed in the mold of a conventional centrifugal pipe-casting machine and a conventional high strength, high heat distortion vinyl ester resin such as DERAKANE 411-C-50 is injected into the mold and distributed throughout the reinforcement material to form the body of the pipe. The conventional casting procedure is to inject the vinyl ester resin into the mold and rely on the centrifugal force generated to distribute the resin both longitudinally and circumferentially of the mold and throughout the reinforcement material.

Preferably, only sufficient resin is injected so as to just encapsulate the reinforcing material without leaving any significant unreinforced resin layer at the inside diameter of the pipe.

Once the resin forming the body of the pipe has been distributed evenly throughout the mold, and before curing, a second flexible vinyl ester resin according to the present invention is injected into the inside diameter of the mold and distributed throughout the mold to form a flexible unreinforced inside layer or liner for the pipe. Both thermosetting resins are then cured by application of heat to the mold during centrifugation to form the finished product. The flexible resin lining may be of any desired thickness, but is preferably in the range of 0.0625 to 0.125 inches.

Injecting the second flexible thermosetting resin into the mold before the first layer has been cured, will result in some intermingling of the two layers at their interface. Upon curing, the intermingled resins will cross-link, thus providing an excellent chemical bond between the two layers of the finished pipe. However, there is some disadvantage, since the inside layer or lining will be slightly adulterated by the commingling between the two layers of resin. Thus, in some cases, it may be desirable to use a slight excess of the flexible resin in order to insure a sufficient thickness of the unadulterated flexible resin layer.

As an alternative to casting both layers of the pipe prior to curing, it is possible to cure the body of the pipe immediately after it has been cast by application of heat to the mold at that time. Once the body has been cured, the flexible resin for forming the lining may be injected (either with the mold rotating or stationary) and subsequently distributed throughout the inside diameter of the pipe by rotation. The lining is then cured by a second application of heat to the rotating mold. This procedure, although it produces a more discrete border between the inner and outer layers of the pipe, has the disadvantages of requiring two separate curing steps, thereby adding to the manufacturing time and cost. For this reason the preferred procedure is to cast both layers prior to curing.

Regardless of which procedure is used for casting the pipe, adequate chemical bonding between the two layers is provided. When both layers are cast prior to curing, intermingling and cross-linking between the two layers occurs, as described above. When the inner layer, or liner, is cast upon an already cured outer layer, the flexible resin still chemically bonds to the body by adhesive forces.

Pipe produced according to the invention possesses chemical resistance equal to and in some instances better than normal CL grade vinyl ester pipe. Also, the strength and durability of the pipe appears substantially improved. The force required to initiate an impact crack is increased from approximately 1½ foot pounds for conventional pipe to approximately 18 foot pounds for the composite pipe of the invention. In slow pressure rise weep tests, failure of the two-layer pipe of the present invention occurred at pressures of from 50 percent to 70 percent higher than those for standard CL pipe of the same wall thickness.

Crack resistance of the pipe also appears substantially increased. Impact cracks, when introduced, do not tend to propagate and no stress relieving cracks were produced by thermal expansion and contraction of the pipe in the test range of 250° to 67°F. The finished pipe can be cold cut without cracking.

The foregoing description and disclosure of the invention is illustrative and explanatory thereof, and various changes in the materials and details of the illustrated procedure may be made, within the scope of the appended claims, without departing from the spirit of the invention.

What is claimed is:

1. A thermosetting resin composition comprising the reaction product of an epoxy resin, a carboxyl terminated elastomer selected from the group consisting of carboxyl terminated homopolymers and copolymers of conjugated dienes and an unsaturated monocarboxylic acid,
   wherein approximately one chemical equivalent of epoxy is provided for each chemical equivalent of carboxyl provided by said elastomer and said acid combined.

2. The composition according to claim 1 wherein said epoxy resin is a di-epoxide.

3. The composition according to claim 1 wherein said elastomer is selected from the group consisting of carboxyl terminated butadiene and a carboxyl terminated random copolymer of butadiene and acrylonitrile.

4. The composition according to claim 1 wherein said acid is selected from the group consisting of acrylic acid and methacrylic acid.

5. A thermosetting resin composition comprising an admixture of (1) a neat thermosetting resin formed by reacting an epoxy resin, a carboxyl terminated elastomer selected from the group consisting of carboxyl terminated homopolymers and copolymers of conjugated dienes and an unsaturated monocarboxylic acid with approximately one chemical equivalent of epoxy being provided for each chemical equivalent of carboxyl provided by said elastomer and said acid combined and (2) an ethylenically unsaturated monomer.

6. The resin of claim 5 wherein said carboxyl terminated elastomer is selected from the group consisting of carboxyl terminated butadiene and a carboxyl terminated copolymer of butadiene and acrylonitrile, and wherein said ethylenically unsaturated monomer is styrene.

7. The resin of claim 5 wherein said epoxy resin is a di-epoxide.

8. The resin of claim 5 wherein said unsaturated carboxylic acid is selected from the group consisting of acrylic acid and methacrylic acid.

9. A thermosetting copolymerizable resin composition comprising an admixture of (1) approximately 50 weight percent of a neat thermosetting resin formed by reacting an epoxy resin, a carboxyl terminated elastomer selected from the gorup consisting of carboxyl terminated homopolymers and copolymers of conjugated dienes and an unsaturated monocarboxylic acid, with approximately one chemical equivalent of epoxy being provided by said epoxy resin for each chemical equivalent of carboxyl provided by said elastomer and said acid combined and (2) approximately 50 percent weight of an ethylenically unsaturated monomer.

10. The thermosetting resin of claim 9 wherein said ethylenically unsaturated monomer is styrene.

11. A thermosetting copolymerizable resin composition comprising an admixture of (1) approximately 50 weight percent of a neat thermosetting resin formed by reacting approximately 1 part by weight methacrylic acid, approximately 2 parts by weight of a carboxyl terminated random copolymer of butadiene and acrylonitrile and approximately 2 parts by weight of a di-epoxide, with approximately one chemical equivalent of epoxy being provided by said di-epoxide resin for each chemical equivalent of carboxyl provided by said elastomer and said methacrylic acid combined and (2) approximately 50 weight percent of styrene.

* * * * *